United States Patent [19]

Klinner et al.

[11] Patent Number: 4,518,124
[45] Date of Patent: May 21, 1985

[54] CROP COMMINUTING APPARATUS HAVING VIBRATING CUTTING BLADES

[75] Inventors: Wilfred E. Klinner, Milton Keynes; Andrew C. Knight, Dunstable, both of England

[73] Assignee: National Research Development Corporation, London, England

[21] Appl. No.: 578,983

[22] Filed: Feb. 13, 1984

Related U.S. Application Data

[63] Continuation of Ser. No. 501,052, Jun. 8, 1983, abandoned, which is a continuation of Ser. No. 192,036, Sep. 29, 1980, abandoned.

[30] Foreign Application Priority Data

Oct. 2, 1979 [GB] United Kingdom ............... 7934214

[51] Int. Cl.³ ............................................. B02C 21/02
[52] U.S. Cl. ................................. 241/101.7; 241/282; 241/283
[58] Field of Search ............... 241/94, 101.7, 280, 241/282, 283, 286, 290

[56] References Cited

U.S. PATENT DOCUMENTS

| | | | |
|---|---|---|---|
| 2,375,370 | 5/1945 | Krider | 241/286 |
| 3,490,505 | 1/1970 | Holz . | |
| 3,797,216 | 3/1974 | Resetich | 56/364 |
| 3,823,881 | 7/1974 | Grob | 241/94 X |

FOREIGN PATENT DOCUMENTS

| | | |
|---|---|---|
| 138427 | 2/1903 | Fed. Rep. of Germany . |
| 165626 | 3/1905 | Fed. Rep. of Germany . |
| 832215 | 1/1952 | Fed. Rep. of Germany . |
| 1897669 | 7/1964 | Fed. Rep. of Germany . |
| 1932424 | 2/1966 | Fed. Rep. of Germany . |
| 1960114 | 5/1967 | Fed. Rep. of Germany . |
| 1273892 | 7/1968 | Fed. Rep. of Germany . |
| 1556092 | 1/1970 | Fed. Rep. of Germany . |
| 1299001 | 12/1972 | Fed. Rep. of Germany . |
| 2402303 | 7/1975 | Fed. Rep. of Germany . |
| 425319 | 9/1965 | Switzerland ............... 241/101.7 |
| 434850 | 10/1967 | Switzerland . |
| 514408 | 12/1971 | Switzerland . |
| 792415 | 3/1958 | United Kingdom . |
| 902067 | 7/1962 | United Kingdom . |
| 1012607 | 12/1965 | United Kingdom . |
| 1132328 | 10/1968 | United Kingdom . |
| 1139234 | 1/1969 | United Kingdom . |
| 1168469 | 10/1969 | United Kingdom . |
| 1166546 | 10/1969 | United Kingdom . |
| 1170060 | 11/1969 | United Kingdom . |
| 1204155 | 9/1970 | United Kingdom . |
| 1327177 | 8/1973 | United Kingdom . |
| 1423787 | 2/1976 | United Kingdom . |
| 1452333 | 10/1976 | United Kingdom . |
| 1475734 | 6/1977 | United Kingdom . |
| 31192 | 7/1981 | United Kingdom . |

Primary Examiner—Howard N. Goldberg
Assistant Examiner—Timothy V. Eley
Attorney, Agent, or Firm—Cushman, Darby & Cushman

[57] ABSTRACT

An apparatus for comminuting crop includes a duct through which the crop is fed by a reciprocating piston with the duct having reciprocating knives extending thereacross for cutting the crop. The knives are spring-mounted for movement under crop pressure in the horizontal plane against the returning influence of a compression spring.

9 Claims, 34 Drawing Figures

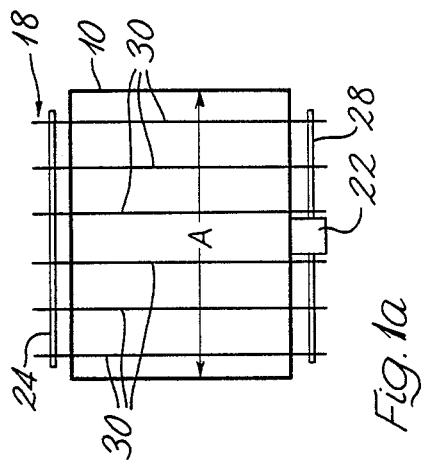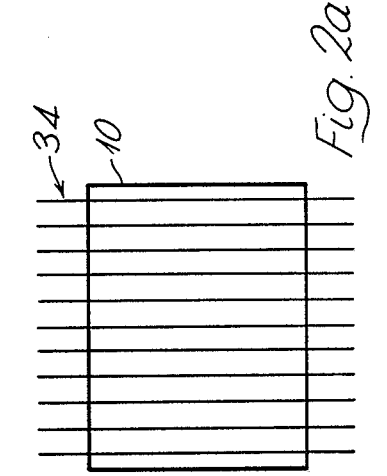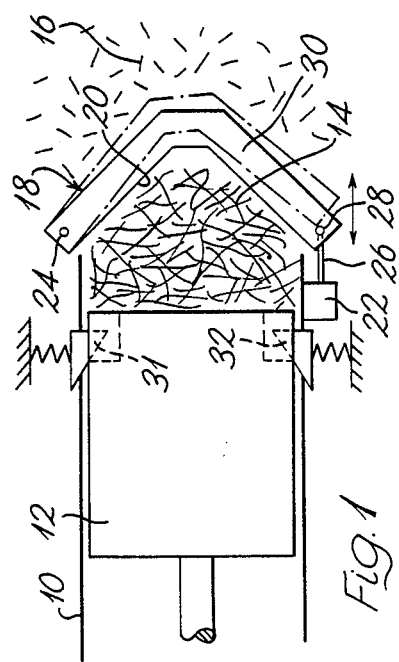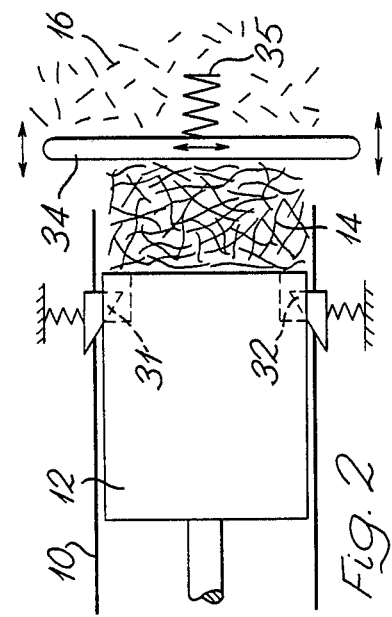

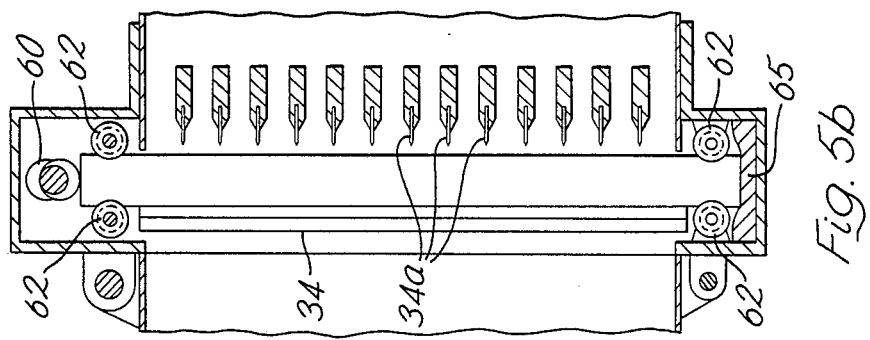
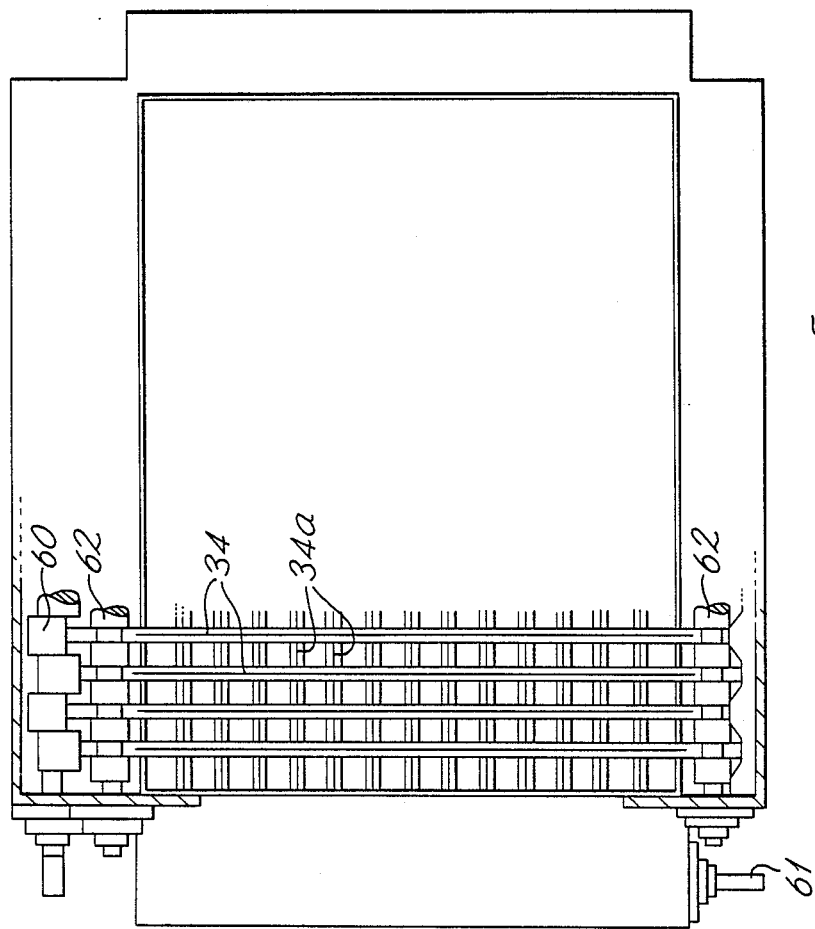

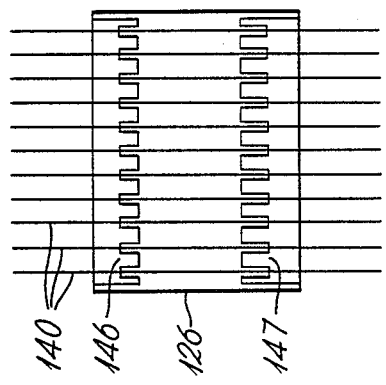
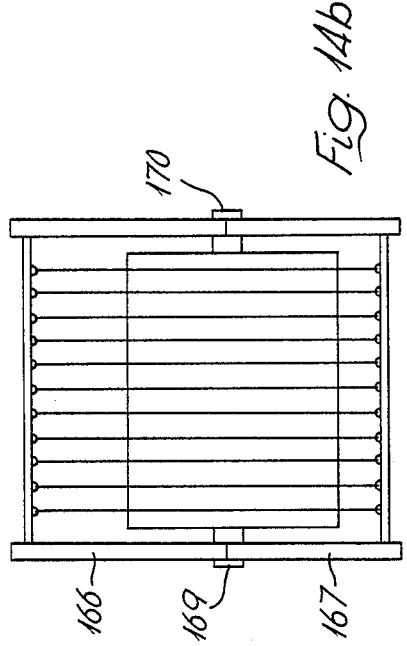
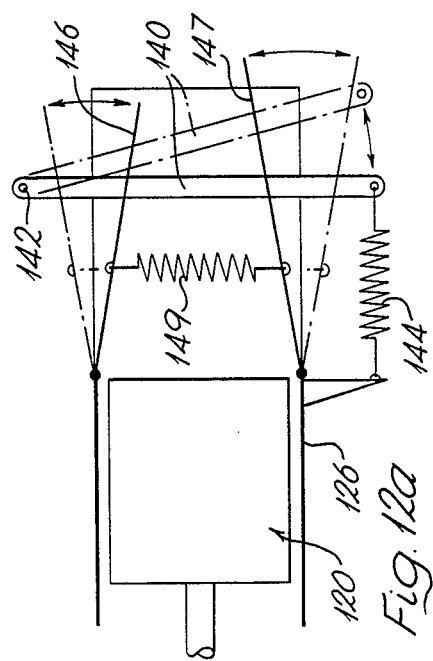
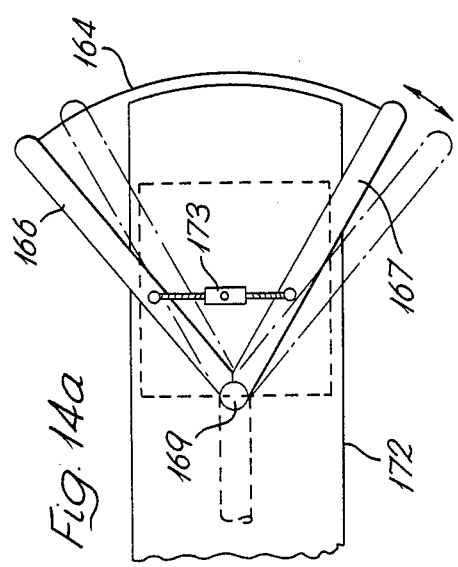

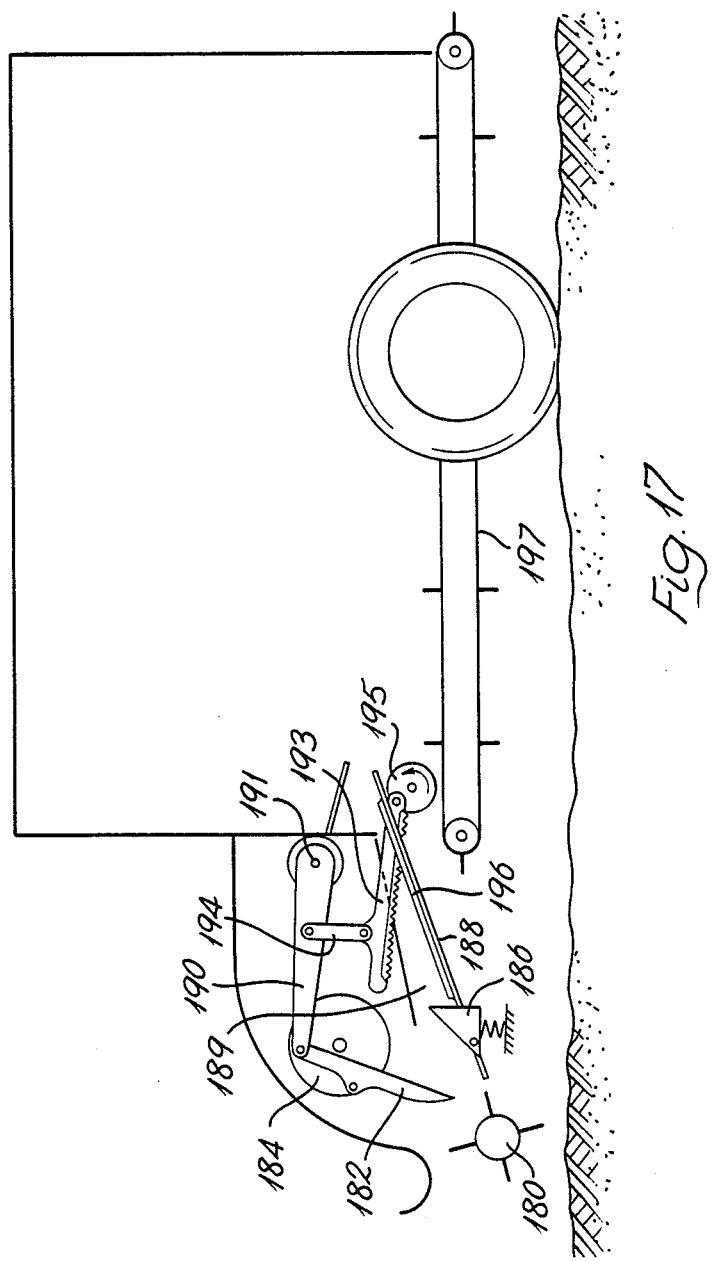

CROP COMMINUTING APPARATUS HAVING VIBRATING CUTTING BLADES

This is a continuation of application Ser. No. 501,052, filed June 8, 1983 which itself is a continuation of application Ser. No. 192,036, filed Sept. 29, 1980 both now abandoned.

The invention relates to apparatus for comminuting cut crop.

The invention also relates, but not exclusively, to forage harvesters, balers or like machines e.g. forage wagons or pick-up balers, incorporating apparatus for comminuting crop handled by the machine.

Examples of such machines are already known. In one known forage harvester, for example, the crop is comminuted by a cylinder-type chopper using what is termed the double chop principle, i.e. a flail type cutting/pick-up mechanism which causes a degree of comminution before the crop is fed into the cylinder chopper proper.

In other known forage harvesters, the crop is cut in the horizontal plane by shear or impact, or alternatively pre-cut crop is picked up by a tine-bar mechanism, before being conveyed to a flywheel or cylinder-type chopping mechanism. Both these types of chopping mechanism have multiple knives attached to a high-speed rotor, which cut the layer of crop presented to them into lengths by single shear as the crop layer passes over the edge of a ledger plate. The knives and/or special blades then impel the chopped crop through a chute and ducting into a collecting trailer or container. Some current forage harvesters additionally have special blower units to ensure good delivery irrespective of the settings and state of maintenance of relevant components.

Similarly in a known self-loading, crop-slicing forage wagon, the crop, after having been picked up by a conventional tine-bar mechanism, passes into a ducting through which it is elevated by sets of heavy paired tines on a conveyor chain. Intruding into the ducting, usually from below, are two banks of stationary serrated knives over which the crop is forced in such a way that one of each tine pair passes on either side of a knife in one bank and both tines pass between knives in the other bank. This is a typical arrangement, but different makes of forage wagon use designs of knives and conveying means which differ in detail. The principle used may be described as slicing a low density column of crop by double shear achieved by conveying components which actually intrude into, and practically all of the way through, the crop layer.

According to the present invention, an apparatus for comminuting cut crop comprises an advancement duct, comminuting means providing one or more cutting edges spanning, or in combination spanning, a cross-sectional dimension of the duct, and advancement means for moving a compressed column of the cut crop along the duct towards the comminuting means, each cutting edge being arranged to cut the column along a cutting plane containing that edge and lying substantially parallel to the direction of crop advancement through the duct.

In the prior art systems, the cutting means rely for their effectiveness either on their movement through the crop or on intimate co-operation with some other means moving through the crop to produce a shear. This requirement results in existing chopping systems having a relatively high power demand, susceptibility to expensive damage of foreign objects mixed with the crop, the need for precision in setting the mechanisms to perform effectively and efficiently, high maintenance requirement, and—in the case of loader wagons—a degree of comminution which is inadequate for some purposes. With the apparatus of the present invention, at least one or more of these disadvantages should be significantly reduced or substantially avoided. Conveniently, but not exclusively, the one or more cutting edges are provided by cutting elements held in tension across the crop path.

Preferably, the opposed operative faces of the advancement means and/or the comminuting means are disposed in a generally concave or convex fashion so that the load imposed on the comminuting means by the advancing crop column is spread over a significant distance of travel of the advancement means. In one such case where a plurality of said cutting edges is provided, these may be staggered so as to span said cross-sectional dimension of the duct in a V-type or roughly V-type formation.

Conveniently, the one or more cutting edges are provided by knives or hoop-shape or modified hoop-shape arranged with the concave side of the hoop-shape facing the duct inlet. In one such case, the one or more cutting edges comprise two outer sections which converge in the direction of advancement of the crop column and a central arrow-headed section the edges of which overlap the leading edges of the outer sections and converge in the opposite direction thereto.

As an alternative, each cutting edge may be provided by a respective chevron-shaped comminuting element with the point of the chevron shape pointing towards the duct inlet. This is an example of having the operative face of the comminuting means disposed in a generally convex fashion.

Conveniently, but not exclusively, each cutting edge is preceded in the crop path by a flow-divider and the comminuting means is provided with support means at a region of the comminuting means shielded from the oncoming crop by the flow-divider. Conveniently, a leading edge of the flow-divider presents an additional cutting surface to the crop flow. Where each cutting edge is provided by a centrally-pivoted comminuting element e.g. as with the respective chevron-shaped comminuting element above described, then conveniently the support means for the comminuting means comprises a pivot shaft and each comminuting element is mounted for pivotal movement in its cutting planes about the pivot axis.

If desired, each cutting edge may be provided by wire-like elements or by like filamentary cutting elements, e.g. chains, which maybe studded with cutting knives and stretched between pivotally-mounted support means operative to reciprocate the cutting elements in their cutting planes, the cutting elements assuming a curved shape or formation when under load from the crop column in the duct with the concave side of the curved shape facing the oncoming crop.

Conveniently, when a plurality of cutting edges is present, the cutting planes for the cutting edges are laterally separated from one another along the cross-sectional dimension of the duct.

Conveniently, opposed walls of the duct are longitudinally slotted and the comminuting means comprises one or more comminuting elements extending across the duct and through the slots in said opposed walls. In this case, said cutting edges may comprise first cutting edges which co-operate in a scissors-like cutting action with second cutting edges provided by one of the opposed walls between the said slots in that wall.

When more than one cutting edge is present, the cutting edges are preferably parallel to one another. Conveniently, drive means are provided for actuating or vibrating the one or more cutting edges in a pivotal motion contained within the or each said cutting plane. Alternatively, drive means may be provided for actuating or vibrating the one or more cutting edges in directions lying substantially parallel to said cross-sectional dimension of the duct.

Conveniently, the comminuting means are able to move under crop pressure in the general direction of crop column advancement.

The apparatus of the present invention conveniently includes input means for supplying cut crop to the inlet end of the duct. This input means may be operative to form the cut crop into a compacted crop column, or it may be operative to supply the cut crop as a pre-formed compacted crop column.

The input means above referred to is preferably operative to supply the cut crop to the inlet end of the duct with at least the majority of the herbage stems and leaves inclined at 45° or more to each said cutting plane. Preferably, in this case, the input means is operative to supply the cut crop to the inlet end of the duct with the majority of the herbage stems and leaves lying substantially perpendicular to each said cutting plane.

The input means may comprise a tine-bar pick-up followed by an auger and/or fork- or push-bar-type feed mechanism.

As an alternative, the input means may comprise a rotating pick-up brush and a counter-rotating feed brush or concave cooperating with the pick-up brush to define between the two brushes a narrow passage in which favourable orientation of the cut crop will occur during operation of the apparatus.

Conveniently, the brushing surface of at least one said brush is substantially parallel to the rotation axis of that brush and the end faces are at an angle of other than ninety degrees to said axis. In this case the planes of individual brush elements or filaments or rings thereof of at least one said brush are conveniently at said angle of other than ninety degrees to the said axis.

Alternatively, at least one said brush is constructed of separate tufted rings set at a slight angle to the axis of rotation of the brush.

Conveniently, the brush elements or filaments of one of said brushes are arranged in a first spiral and the brush elements or filaments of the other of said brushes are arranged in a second spiral of opposite operative direction to the first spiral.

If desired, the comminuting means hereinbefore referred to may comprise first comminuting means and said one or more cutting edges then comprise one or more first cutting edges, a second comminuting means also being provided to provide one or more duct-spanning second cutting edges spaced along the duct from the one or more first cutting edges. Conveniently, in this case, the one or more second cutting edges are substantially perpendicular to the one or more first cutting edges.

The one or more second cutting edges may be stationary and be positioned upstream of the first cutting edges. Alternatively, where drive means are provided for vibrating the one or more first cutting edges, then drive means may also be provided for vibrating second cutting edges e.g. either in a parallel motion but out of phase with, or in directions lying perpendicular to, the vibrational motion of the first cutting edges.

When more than one second cutting edge is present, the cutting planes for the second cutting edges are preferably laterally separated from one another across the duct.

The advancement means hereinbefore referred to, may comprise a segmented piston head which during at least a portion of its advancement stroke interdigitates with portions of the comminuting means presenting the one or more cutting edges. Conveniently, in this case, the recesses between adjacent segments of the piston head are open-bottomed to allow the escape of any foreign particles which might otherwise become trapped within the recesses.

Conveniently, whether one or two comminuting means are present, then each comminuting means provides more than one said cutting edge and the cutting edges of the or each comminuting means are separated from one another transversely to and/or longitudinally with the direction of crop column advancement through the duct.

The invention also includes a forage harvester, baler or like machine incorporating a comminuting apparatus according to the present invention. Conveniently, the machine includes an auger, chain, belt or other conveyor for conveying crop comminuted by the comminuting apparatus from a collecting hopper region of the machine to a discharge end of the conveyor housing and a bladed, or tined, or paddle rotor located at said discharge end of the auger housing to receive comminuted crop from the conveyor and operative to impel this crop laterally or rearwardly of the machine.

Conveniently, the forage harvester, baler or like machine is adapted to produce both a flow of crop comminuted by the apparatus and, as an alternative, to package the cut crop instead of comminuting it.

The invention includes in particular a forage wagoon incorporating a comminuting apparatus according to the present invention and in which crop is fed from a pick-up to a set of rotating feed elements which move the crop past appropriate column-retaining means securing the crop column against reverse movement during operation of the comminuting means.

Embodiments of the invention will now be described, by way of example only, with reference to the accompanying drawings in which:

FIGS. 1 and 1a are simplified partially diagrammatic side and end views of the principal components of a first embodiment of the invention;

FIGS. 2 and 2a are similar views of a second embodiment;

FIG. 5a is an end view and FIG. 5b is a longitudinal section of part of an alternative design of machine to that shown in FIGS. 4a and 4b;

FIGS. 12a and 12b are a simplified partially diagrammatic longitudinal section and an end view of a ninth embodiment;

FIGS. 14a and 14b are similar views of an eleventh embodiment;

FIG. 17 is a similar view of a forage wagon incorporating a comminution apparatus according to the present invention.

Figure 3B:
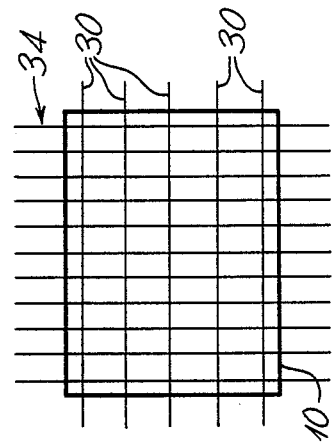
FIGS. 3a and 3b are similar views of a third embodiment.

Referring first to FIGS. 1 and 1a, a comminuting apparatus according to the present invention comprises a crop advancement duct 10 and a piston 12 for compressing and moving a compressed column of the cut crop 14 along the duct towards the outlet end 16 of the duct. The comminution means 18 is provided by a plurality of elongate hoop-shaped knives 30 having cutting edges 20 arranged across the outlet end of the duct 10.

As will be seen from FIG. 1a, the knives 30 are parallel to one another and are laterally separated in a direction parallel to the width dimension A of the duct 10. The cutting edges 20 of these knives each define a cutting plane containing the edge concerned and parallel to the plane of FIG. 1 i.e. to one of those planes containing the direction of crop advancement through the duct.

At its inlet end (not shown), the duct is provided, from an appropriate input means, with cut crop having a significant proportion of the herbage stems and leaves lying perpendicular or nearly perpendicular to the cutting planes of the knives 30. Typical of such known input means would be a tine-bar pick-up followed by an auger and/or fork- or push-bar-type feed mechanisms as used in conventional pick-up-type harvesting machines, including pick-up balers. Other preferred input means will be hereinafter described with reference to FIG. 16 of the accompanying drawings.

Reference numeral 22 indicates a drive means for optionally vibrating the cutting edges in a pivotal motion about a common top pivot 14 in which each such edge moves in a plane substantially parallel to the direction of crop advancement. The drive means is connected to the cutting means by a T-shaped linkage 26, 28. The two extremes of this vibratory travel are indicated in FIG. 1 by the full-line and broken-line representations of the knives 30.

The knives 30 are held in tension across the crop path. The edges 20 must be sharpened and may be serrated or scalloped.

In the situation illustrated in FIGS. 1 and 1a, the piston 12 is at its extreme rearward position, having forced a charge of crop against the vertical knives 30. Successive charges displace previously deposited crop, forcing it through the grid provided by the knives. Spring-loaded crop-retaining wedges 31, 32 prevent the last charge of the compacted crop column expanding upstream when the piston 12 returns to the inlet and for the next charge. The action of compacting the crop on advancing it along the duct can assist in bringing stems and leaves across the cutting planes of the knives.

The drive means 22 either vibrates the knives 30 at a high frequency, e.g. in the region of 100 cycles per second, but with a low amplitude, e.g. approximately 1–3 mm, or with a frequency that is low, e.g. in the region of 10 cycles per second, but with a high amplitude e.g. approximately 10–50 mm.

In modifications (not shown) of this embodiment, the knives 30 are pivoted at the bottom and vibrated at the top.

FIGS. 2 and 2a show a basically similar arrangement in which the knives (34) are linear (FIG. 2) and are vibrated by drive means (not shown) so that their cutting edges reciprocate in directions lying substantially parallel to their span dimensions.

In addition, the knives are spring mounted for movement under crop pressure in the horizontal plane against the returning influence of compression spring 35. In this way the knives are able to work effectively throughout the compacting and re-charging cycle of the piston. The knives are shown in the vertical plane in FIGS. 1 and 2 but other planes maybe used if appropriate.

Throughout the remainder of the description, where reference numeral 30 is used, this indicates fixed knives and pivoted knives whilst reference numeral 34 (or 34a) will be used to indicate reciprocated knives or knife grids.

Figure 3D:
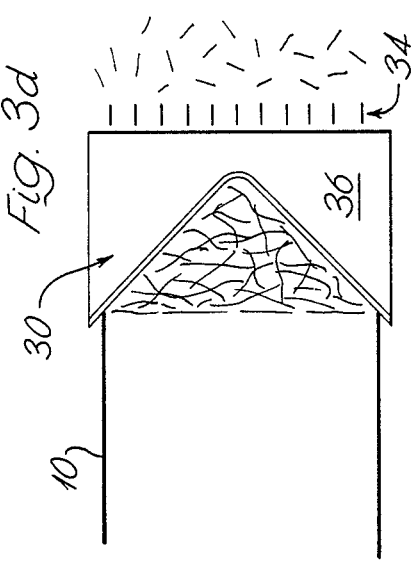
FIG. 3d is a similar view of the comminuting means of a fourth embodiment.
Figure 3A:
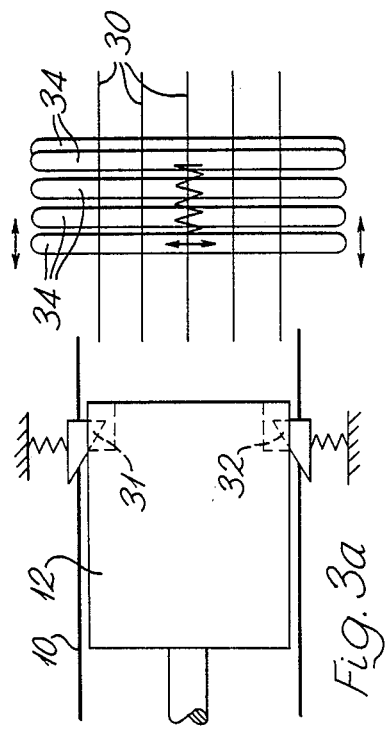
Figure 3C:
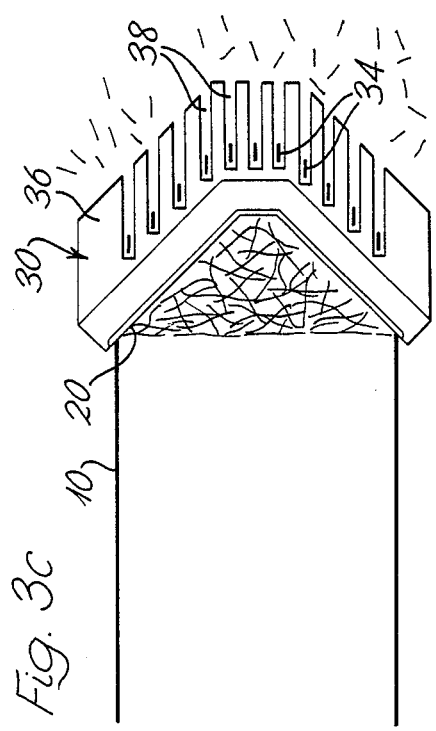
FIG. 3c shows in simplified partially diagrammatic plan view the comminuting means of the third embodiment.

Turning now to FIGS. 3a and 3c, these show a comminution apparatus in which the cutting edges comprise first cutting edges provided by knives 34, and a plurality of elongate second cutting edges is provided by a second set of knives (30). Knives 34 which are arranged in a curved formation when viewed in plan (see FIG. 3c), are partly housed in the slotted rear portions 36 of the second set with their cutting planes perpendicular to those of the second set.

Like the knives 30, the knives 34 are mounted in tension across the crop path within the duct 10 but unlike knives 30 they are free to move with the crop and to vibrate perpendicularly to the crop advancement, the relative movement between the two sets of knives occurring within the slots (38) in knife portions 36. In this respect it will be observed that FIG. 3c illustrates the situation where the knives 34 are at the forward extreme of their horizontal travel.

FIG. 3d shows a plan view of an alternative arrangement in which the rear portions 36 of the knives 30 are squared-off to allow a grid of vertically reciprocating knives 34 to be placed in a line across the width of the crop path.

It is one important function of the stationary knives 30 in FIGS. 3a and 3d to help build up density in the crop column, as a result of the resistance which the knives cause to crop flow. Another function is to stabilise the horizontally sliced crop column in the vertical plane, so that the reciprocating knives 34 are able further to divide the crop column perpendicularly without imparting significant movement to the crop.

Figure 4A:
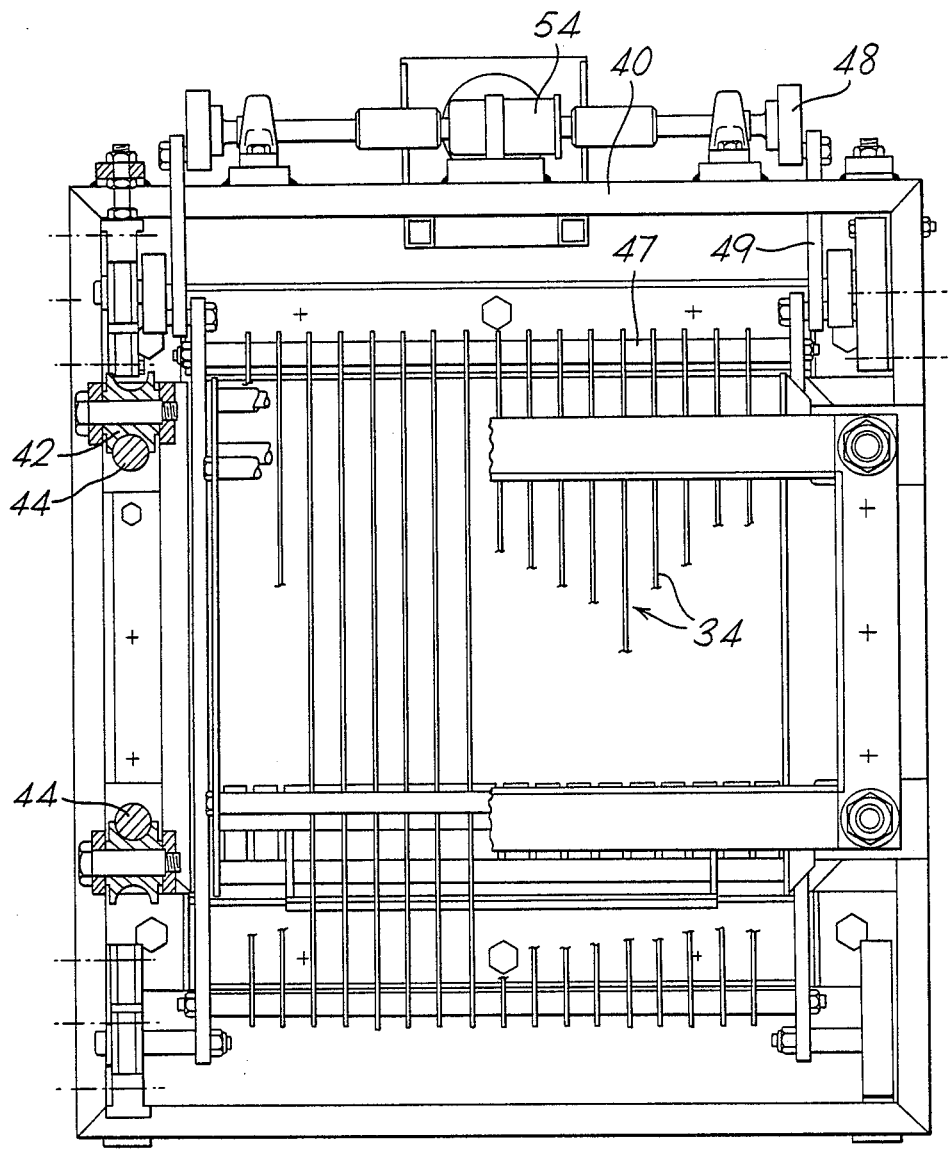
FIGS. 4a and 4b are more detailed end and side views of part of a machine according to the present invention.
Figure 4B:
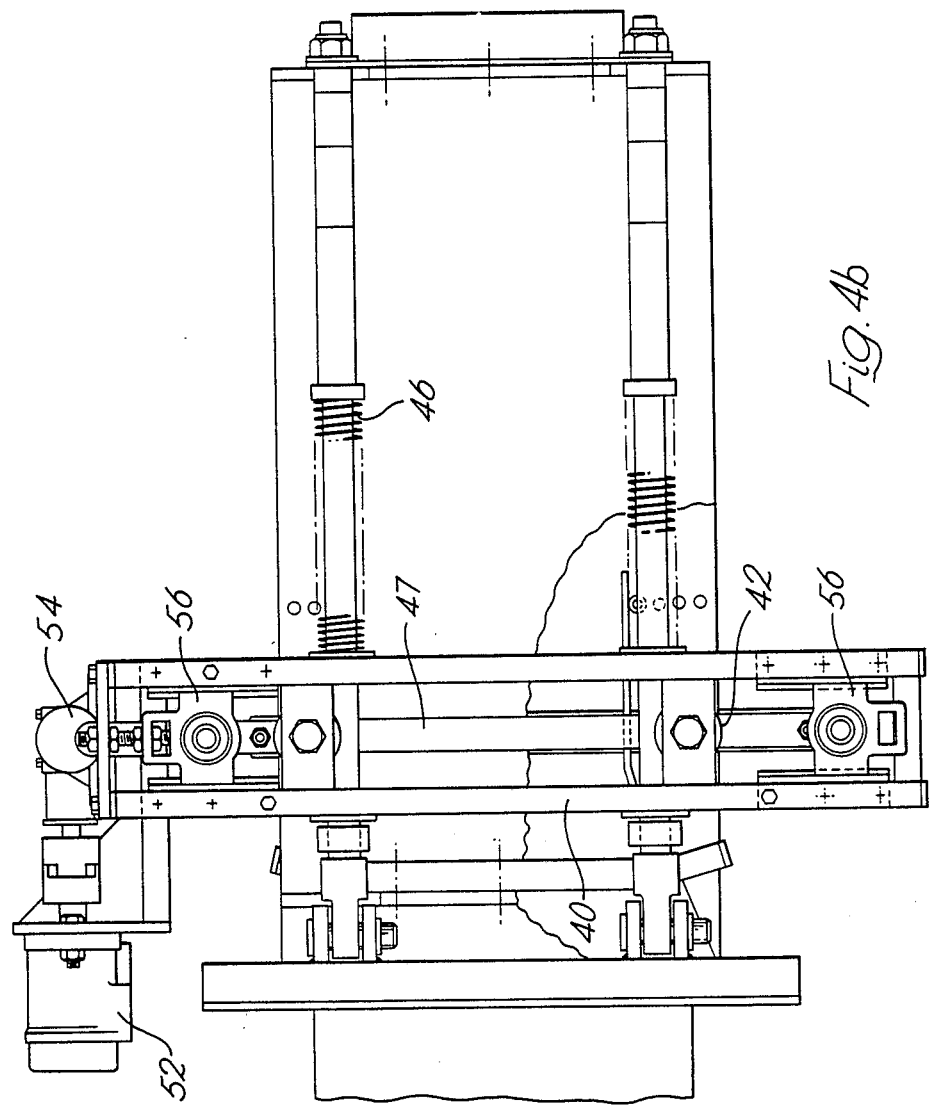

FIG. 4a shows the complete reciprocated knife assembly mounted inside a frame 40 which surrounds the duct 10 in such a way that it can move on rollers 42 along horizontal guides 44 if the crop pressure on the knives 34 should become greater than the resistance of the springs 46 shown in FIG. 4b. The grid of knives 34 is driven in unison by a crank and pitman 48, 49 on the extreme left and right, through a sub-frame 47 from the transverse shaft 50 shown on top of the frame. In the side view, FIG. 4b, a hydraulic motor 52 is shown to be driving the transverse shaft through a right angle drive gearbox 54. The reciprocating knife grid is mounted in sliding bearing assemblies 56 at the top and bottom so that the sub-frame 47 is forced to remain in the vertical plane and the knives 34 stay in constant contact with the crop for efficient comminution.

In a variation (not shown) of this embodiment, the guides 44 are replaced by fixed horizontal tubular rails positioned centrally on either side of the duct and each passing through a correspondingly larger tube attached to either side of the movable comminution apparatus assembly. Suitably dimensioned, lubricated and spring-loaded, this arrangement should provide adequate strength, protection and effectiveness.

Figure 4C:
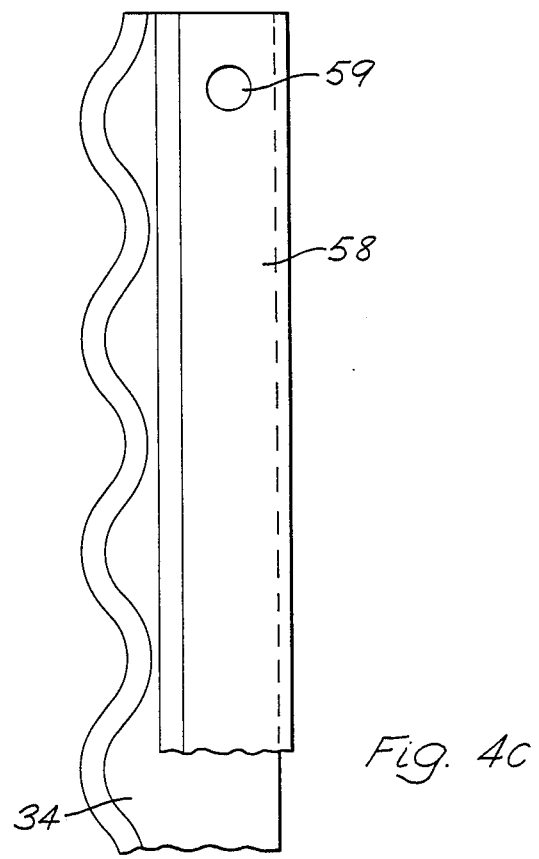
FIGS. 4c and 4d are respectively a side view and a plan view of a convenient design of reciprocated knife and its holder.
Figure 4D:
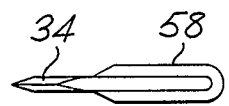

Turning now to FIGS. 4c and 4d, these show a sharpened wavyedged knife 34 held in a folded metal envelope or sheath 58 which is provided with a hole at the top 59 and bottom (not shown) for attachment and subsequent tensioning, in the manner of a hack-saw blade, between the bottom and top members of the reciprocating subframe 47. The folded metal sheath is optional; knives of adequate tensile strength can be tensioned directly between attachment points at opposite ends or can be cantilevered from one end.

FIGS. 5a and 5b show an alternative arrangement to that depicted in FIGS. 4a and b in which two reciprocated knife grids 34 and 34a are placed vertically and transversely across the feed duct, one behind the other. In consequence, material fed along the duct 10 into the knife grids 34 and 34a is successively cut in the vertical and horizontal planes. This arrangement is particularly appropriate where the input means at the inlet end of the duct do not achieve a predominant alignment of the crop, for example if the crop column is formed by a thrust auger. In contrast to the arrangement shown in FIGS. 4a and 4b in which all the knives are reciprocated in unison, the alternative version of FIGS. 5a and 5b shows reciprocated knives which are individually pushed and then returned back through the crop mass in such a way that adjacent knives of the same grid move in opposite directions. This counters any tendency for the crop to be displaced vertically by the knives and, therefore, contributes to efficient cutting. The counter-reciprocatory knife motion is achieved in the embodiment of FIGS. 5a and 5b by driven camshafts 60, 61 at one end of the two knife grids operating directly on to the end of the knives. Rotation of the camshaft firstly pushes the individual knives through the crop, the knives being guided by paired rollers 62 at either end of each knife. Return motion is achieved on further rotation of the camshaft by pressure exerted by a resilient means 65 which had been compressed during the previous stroke. Alternatively each knife may be journalled to a cam on the driven shaft and supported by rollers 62 at the other end. Other methods of driving the knives are possible. One possibility is to use two camshafts driven in unison so that the knives remain in tension between them at all times. The angular displacement between adjacent knives may also be less than 180°. Whilst in the illustrated embodiment the knife spacing will be approximately 25 mm, other spacings may be chosen on one or both knife grids. Although not specifically shown, the twin-grid slicing unit may be mounted on rails and be adjustably spring-loaded, so that it can yield to crop pressure in the direction of crop movement.

To enable the knives to be pushed and pulled through the compacted crop column, they have to be sufficiently strong to withstand particularly the compressive and bending forces during the push stroke. The substantial knife backs shown in side view in FIG. 5b are grooved and bevelled at the front and fitted with thin, sharp-edged inserts for example in the general manner disclosed in FIGS. 4c and 4d.

Figure 6B:
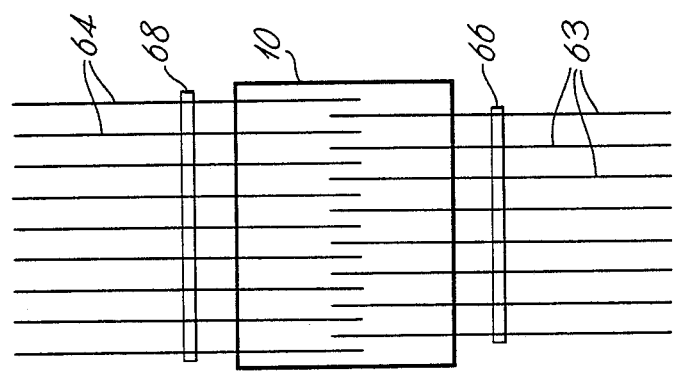
FIGS. 6a and 6b are simplified partially diagrammatic side and end views of the principal components of a fifth embodiment of the invention.
Figure 6A:
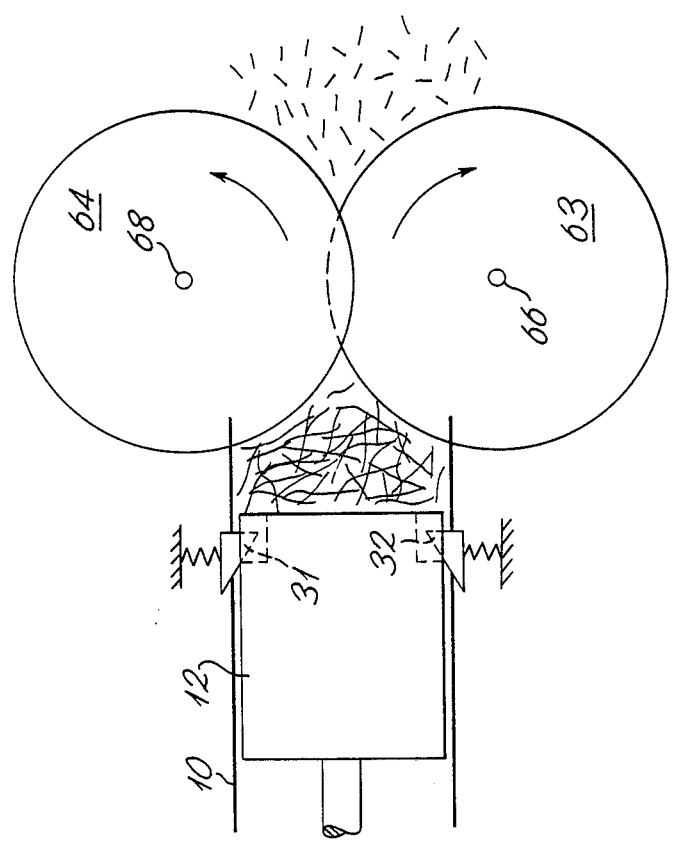

FIGS. 6a and 6b show an arrangement (with the piston 12 in the rearmost position) in which the cutting edges are provided by two sets of counter-rotating sharp-edged or saw-tooth-edged discs 63, 64, rotating about shafts 66, 68 lying perpendicular to the width dimension A referred to earlier (see FIG. 1a). It is to be understood that the direction of rotation of one or both sets of discs may alternatively be opposite to the directions shown. In a modification (not shown) only one set of discs is provided, dimensioned and arranged so as to span the path of the crop column.

Figure 7:
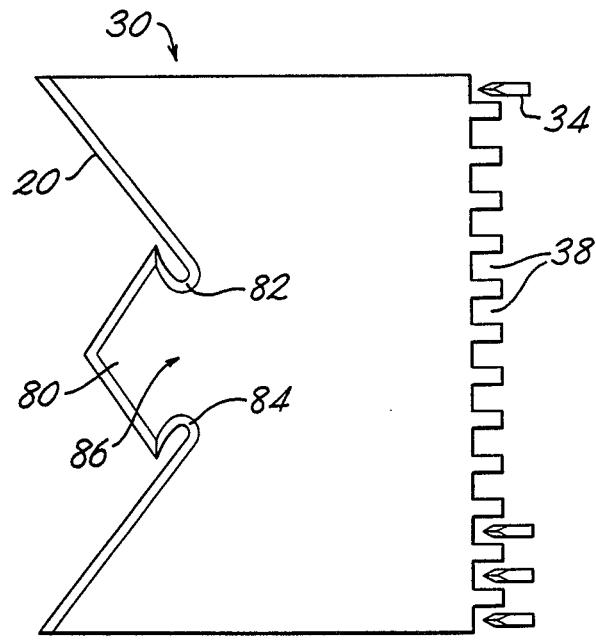
FIG. 7 is a side view of a preferred design of comminuting element having a modified hoop-shape.

Referring now to FIG. 7, this shows a preferred form of knife 30 designed to present a relatively low resistance to crop advancement through the duct. The characteristic feature of knife 30 is that all portions of its cutting edge 20 are at an angle to the crop flow, including the central region, the cutting edge being preferably undercut in the manner shown at 82, 84 so that the effective width covered by the central knife section is substantially greater than the width of the solid bridge 86 which connects it with the main part of the knife.

Figure 8:
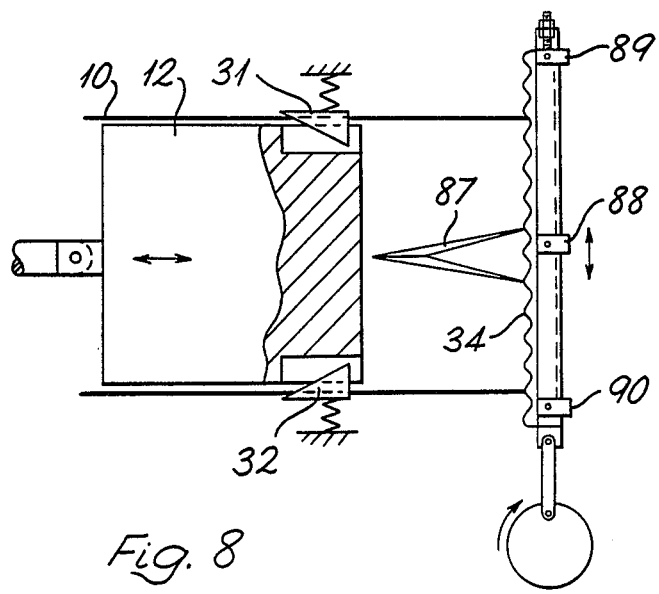
FIG. 8 is a simplified partially diagrammatic side view of a modified form of comminuting means in which a wedge-shaped flow divider has been incorporated.

Obviously the angle of the cutting edges relative to the longitudinal axis of this modified design of knife 30 can differ, and the undercutting of the central arrow-headed section can be achieved in straight lines. At the rear, the knife blade can be straight, or, as shown in FIG. 8, castellated. The vertical reciprocating knives 34 then operate either immediately behind the straight trailed edge, or, as shown, inside the recesses or slots 38.

Referring now to FIG. 8, this shows a preferred arrangement in which a flow-splitting knife 87 is fitted in the central region of the duct 10, the knife 87 then diverging in the vertical plane into a wedge shape. Behind the wedge there is thus created a "shadow" space in which an additionally introduced central transverse frame member 88 can move up and down unimpaired.

Member 88 can serve either as a fixing beam for short knives above and below, or merely act as a central support behind full-length knives 34 as shown in FIG. 8. In the alternative arrangement (not shown) short knives would simply be hooked on to the centre member 8 and tensioned on the upper and lower frame members 89, 90 in the general manner of hacksaw blades; in consequence strength of the centre member 88 in the vertical plane would be relatively unimportant.

As compared with the earlier embodiments, the arrangement of FIG. 8 gives a stronger comminution mechanism in so far as knives 34 are now also supported at their centre regions, and it also reduces any tendency the crop might have at the beginning of work, before sufficient density has built up, to move as a mass in unison with the knives 34 thus preventing cutting from commencing. It is to be understood that the principle of the flow splitting, divergent knife may also be applied, additionally if desired, in the vertical plane, so that at least one substantial vertical brace between the horizontal sub-frame members may be fitted in the "shadow" space.

From the various embodiments of the invention above described it will be appreciated that where stationary comminuting knives are used, then irrespective of whether they are straight, curved or of composite form, they can always be simply-supported and bridge the crop-conveying duct in each case. In comparison to the knives used in conventional loader wagons which are cantilevered and therefore subjected to compression, the stationary knives of the above described illustrated embodiments are always held in tension.

In variations, not shown, of the above embodiments, the reciprocated knives may be replaced by stationary or pivotted knife arrangements. These knives may be housed in a separate casing of slightly larger cross-sectional dimensions than the crop advancement duct, perhaps (but not necessarily) slightly fluted at the front. If the casing is then slideably mounted and spring-loaded on guide rails as previously described a degree of responsiveness to and protection from high crop pressure may be achieved.

Figure 9A:
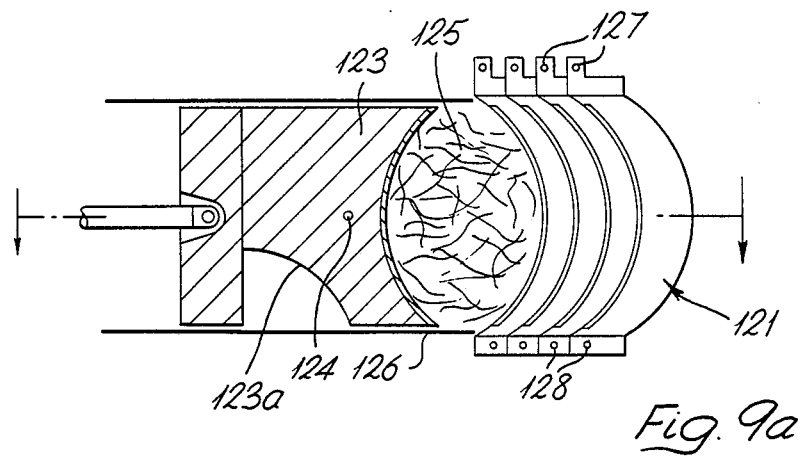
FIGS. 9a, 9b and 9c are simplified partially diagrammatic longitudinal and transverse sections and an end view of the principal components of a sixth embodiment of the comminuting apparatus.
Figure 9B:
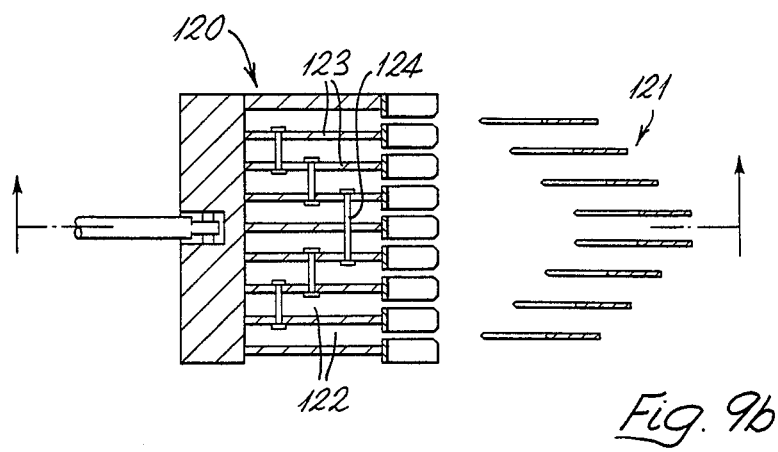
Figure 9C:
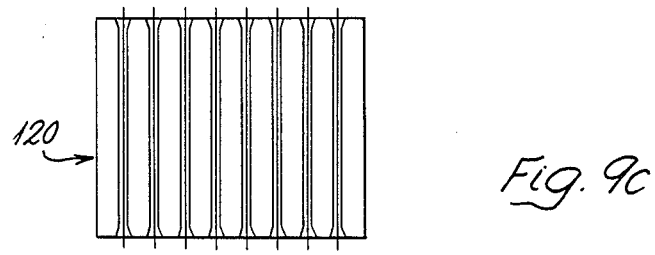

Referring now to FIGS. 9a and 9c, these disclose an embodiment in which the advancement means comprises a segmented concave piston head 120 which interdigitates with stationary knives 121 during the latter part of its advancement stroke. As will best be seen from FIGS. 9b and 9c, the hollow spaces 122 between adjacent segments 123 of the piston head are open-bottomed to allow the escape of any small foreign particles which might otherwise become trapped within them. Accumulations can be further avoided by an optional cut-out 123a in the lower trailing section of each plate as shown in FIG. 9a which supports a piston face segment. Segments 123 can be reinforced by tie-rods, for example as shown at 124 in FIG. 9b.

The operative face of the piston head 120 is of concave form when viewed from the side (FIG. 9a) and the knives 121 which are staggered across the duct in a V-type formation (FIG. 9b) are curved (in side view) in the opposite direction to piston head 120. Having the opposed faces of the piston head and the knives disposed in this generally concave and staggered fashion will result in the load imposed on the system (by the crop charge 125) being spread over some distance of the piston travel so as to reduce the strain on the knives.

The more advanced regions of the piston segments are slightly tapered as shown in FIG. 9c so as to provide lead-in portions which will correctly align the segments with the knives 121 to prevent collision between piston and knives during the interdigitating portion of the piston's travel.

The individual knives 121 are secured in tension across the duct 126, at their top ends by heavy bolts 127 and at their bottom ends by shear bolts 128. Should a foreign object too large to be accepted in recesses 122 be forced against the knives during crop advancement, the bolts 128 can shear allowing the knives to pivot up out of harms way so that the object can pass. Conveniently provision is made for an electrical contact to be either made or broken when any of the shear bolts 128 fail in this way so that an indicator in the tractor cab can alert the driver to what has happened.

Figure 10B:
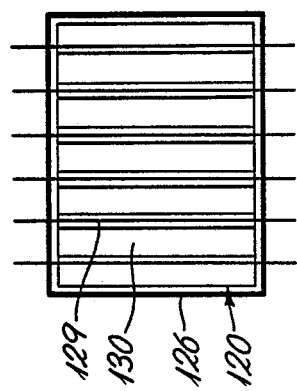
FIGS. 10a and 10b are a simplified partially diagrammatic longitudinal section and an end view of the principal components of a seventh embodiment.
Figure 10A:
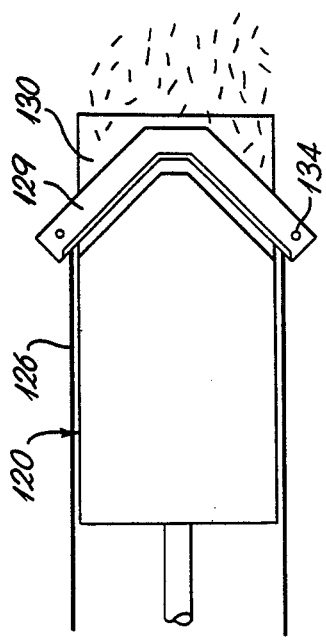

FIGS. 10a and 10b show an arrangement in which an array of hoop-shaped knives 129 are overlapped by a segmented piston 130 at the end of the crop advancement stroke. Although not apparent from the Figures, these knives have a small amount of stagger longitudinally of the duct when viewed from above. Once again the hoop-shape of the knives and their stagger reduce the strain imposed on the system, and as before the piston will have recesses and will be open bottomed and the knives will be secured by shear bolts (134) so as to be able to avoid damage from any foreign objects which may be present in the crop charge. The piston segments may also be provided with lead-in portions (not shown) if desired similar to those shown in FIG. 9c.

Figure 11B:
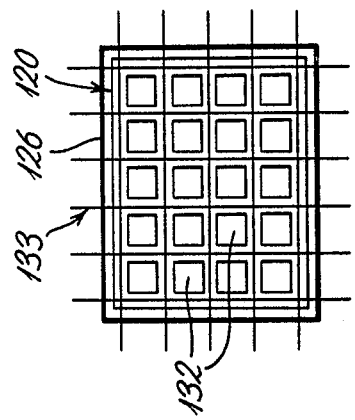
FIGS. 11a and 11b are simplified partially diagrammatic end and side views of an eighth embodiment.
Figure 11A:
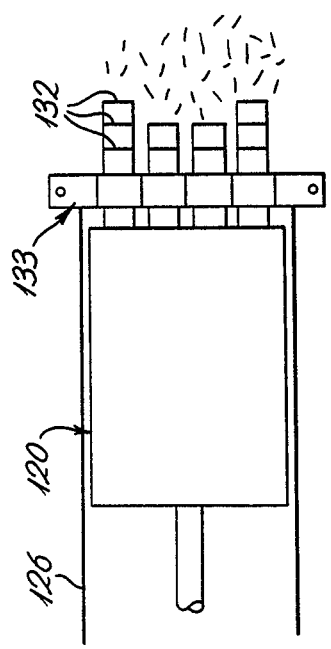

In the embodiment of FIGS. 11a and 11b, the piston segments 132 take the form of punches which interdigitate with a vertical and horizontal knife grid 133. As can be seen from FIG. 11a, the lengths of the piston segments vary so that once again the cutting load is spread over some distance of the final piston travel and the piston segments preferably have small lead-in regions (not shown) to align them correctly with the knife grid.

FIGS. 12a and 12b show an apparatus having much in common with that of FIGS. 4a and 4b, the knives 140 being driven by a crank and pitman arrangement (not shown) as before. However, in the apparatus of FIGS. 12a and 12b the drive spindle 142 serves also as a pivot about which the knife grid can swing e.g. to the position indicated in broken lines in FIGS. 12a in response to the crop load set up every time the piston delivers a new charge. This motion is resisted by a tension spring 144 which returns the knife assembly towards its original position as the crop load is reduced during the return stroke of the piston. The top pivotted mounting of the knife grid is made possible by the crop density in the upper part of the crop chamber usually being lower than that in the bottom part.

Reference numerals 146, 147 indicate top and bottom wall plates pressure-loaded by tension spring 149 to control crop column density. These plates are of course slotted to accommodate the reciprocating knives 140.

Figure 13A:
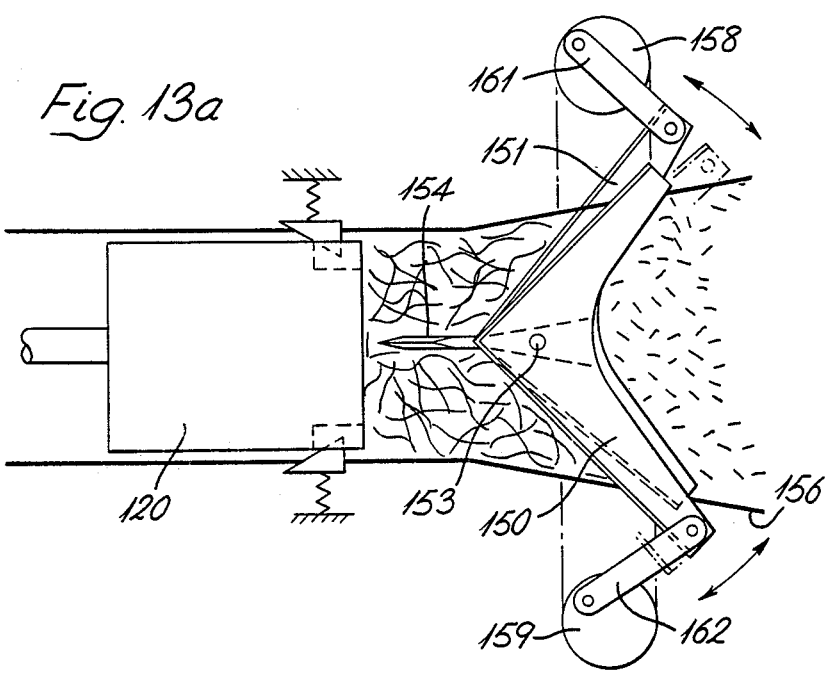
FIGS. 13a and 13b are simplified partially diagrammatic side and end views of a tenth embodiment.
Figure 13B:
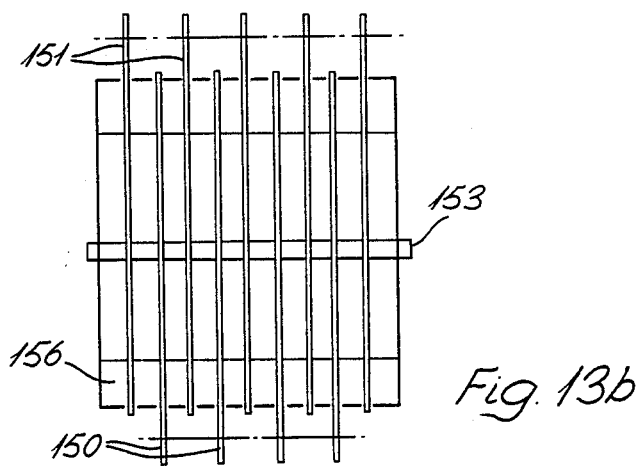

In the apparatus of FIGS. 13a and 13b, the knives 150, 151 are chevron-shaped with their cutting edges sloping away from the centrally located points of the chevron-shapes which face into the crop flow.

Each knife has one arm of the chevron longer than the other.

The knives are freely mounted on a common pivot shaft 153 which is shielded from the crop flow by a curved horizontal knife 154 which precedes it, splits the crop column and allows it to pass over and under the pivot shaft. A centrally located bevel edge extending the length of the knife 154 ensures that the crop pressure is fairly evenly distributed between the top and bottom of the knife.

The arms of the chevron shapes are of unequal length, the longer arms of alternate knives 150 extending to one side (the bottom in the drawing) of the slotted diverging duct 156 and those of the intervening knives 151 extending to the other side (the top in the drawing).

In operation, eccentric drives 158, 159 connected with the longer arms of the knives by rods 161, 162, drive the knives in a reciprocating motion about shaft 153 such that when knives 151 have reached the limit of their anti-clockwise displacement, knives 150 will be at mid travel position and vice-versa.

In the embodiment of FIGS. 14a and 14b, comminution is effected by an array of abrasive parallel wire-like elements or cutting chains 164 stretched between two diverging support frames 166, 167 so as to span the duct cross-section, just downstream of the duct outlet. Frames 166, 167 are mounted on two stub axles 169, 170 which are positioned one on either side of the duct 172 and are driven in a reciprocating pivotal motion by an convenient means (not shown). Although the duct 172 is shown empty of crop, fairly stiff cutting elements 164 have been shown in the configuration they will adopt when under load from material leaving the duct i.e. on or close to an imaginary cylindrical surface whose axis coincides with those of the two shafts 169, 170. This means that as the support frames 166, 167 reciprocate, the cutting elements will each displace longitudinally i.e. along a curved path containing their lengths. A turn buckle arrangement 173 allows the tension of elements 164 to be adjusted so that this "in-line" motion of the elements can be achieved.

Figure 15:
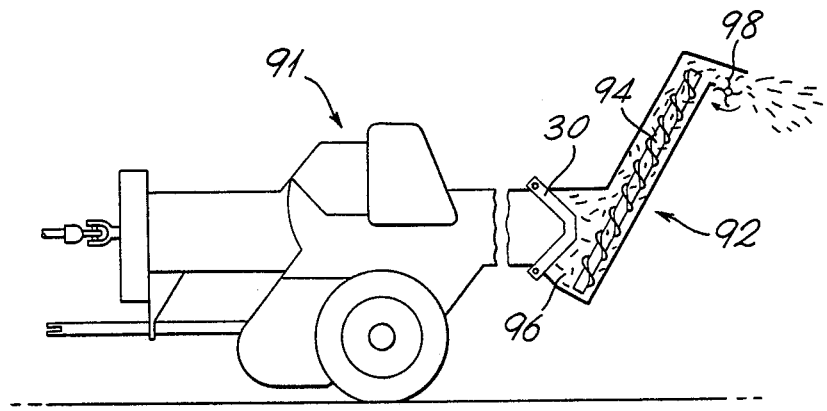
FIG. 15 is a simplified partially diagrammatic side view of a complete baler incorporating a comminuting apparatus according to the present invention.

Referring now to FIG. 15 this shows an otherwise conventional pick-up baler 91 fitted with an alternative end section of bale chamber 92, incorporating a comminution apparatus according to the present invention. After passing the grid of knives 30, the crop is conveyed by auger 94 from a small collecting hopper 96 to a level above the front of a following trailer (not shown). A small flipper rotor 98 at the end of the auger housing rotates at sufficient speed to impel the crop particles so that they reach the rear of the trailer body, allowing it to be filled to full capacity. As an alternative arrangement (not shown) a trailer hopper and elevator unit may be towed with a conventional baler so that the short crop emanating from the rear of the baler is collected and conveyed into the trailer which maybe towed behind or alongside.

In one embodiment of the invention where the comminution apparatus is fitted into a conventional piston-type pick-up baler, the baler is adapted for this purpose by providing a flange to surround the bale chamber at a desired distance from the end of the piston travel. Matching flanges on the rear part of the normal bale chamber and on the comminution apparatus then allow an easy and rapid change from one application to the other. In another embodiment, the comminution apparatus forms part of a dual-purpose harvesting machine.

In satisfactorily incorporating the comminuting apparatus of the present invention into a baler, the following general points may be relevant. First, the cross-sectional bale chamber dimensions of most pick-up balers are 450 mm wide × 350 mm high. A small percentage of balers in use have smaller and larger bale chamber cross-sections. Second, the ram (piston) speed of pick-up balers in common use varies between about 80 and 100 strokes/min. Third, the speed of the proposed reciprocating knives may vary between about 100 to 500 strokes/min, at amplitudes of around 25 to 150 mm. High frequency low amplitude vibration, as specified for the hoop-shaped knives, is an alternative method of driving the elongate knives and is particularly appropriate with sharp, smooth cutting edges.

Figure 16:
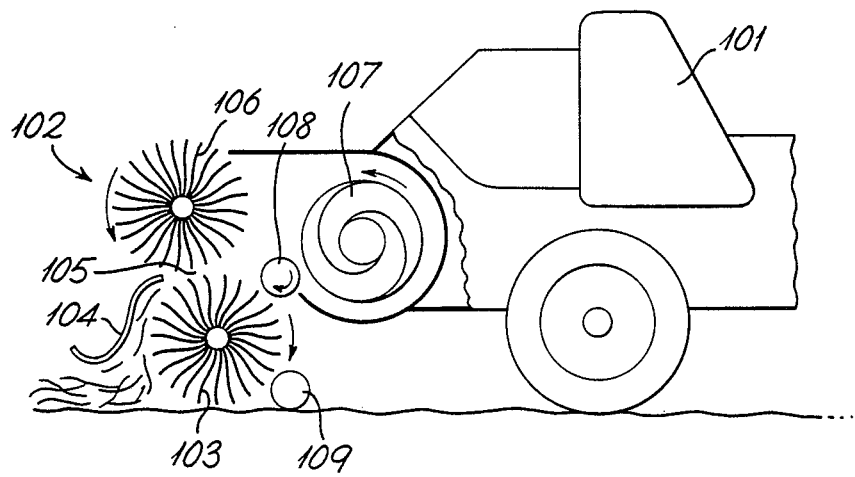
FIG. 16 is a similar view of an otherwise conventional baler incorporating a comminution apparatus (not shown) according to the present invention.

Referring next to FIG. 16, this shows, attached to a conventional baler 101, a pick-up mechanism 102 which has been found to deliver crop predominantly transversely aligned when lifting swaths of mainly longitudinally oriented herbage, for example, swaths normally left by disc, drum and reciprocating mowers.

The mechanism is designed so that, in operation, crop is engaged first by a lower pick-up brush 103 of the mechanism. This brush is similar in construction to brushes used in road sweepers, but operates at the considerably higher peripheral speed of 10 to 25 meters per second. The crop is then conveyed upwards by being forced from beneath against guide 104. As the crop approaches and passes the narrow passage 105 between the rotating brush 103 and a second counter-rotating feed brush 106, the favourable re-orientation of the crop occurs. Likely contributing factors may include the typical distribution of the crop mass along the length of the plant material and a "swash plate" effect derived from the individual tufted rings from which the brushes are constructed being set at a slight angle to the transverse brush axes. Brushes which are helically wound or spirally populated with tufts or filaments bring the same results, when one is co-operating with another or with a crop retarding concave.

On leaving passage 105, the transversely aligned crop enters a conventional transverse feed housing through which the crop is conveyed into the path of a compacting ram by an auger 107, or alternatively (not shown) by a series of moving tines or forks, or a combination of such feed and input means. At the front of the transverse feed housing is fitted a driven roller 108 which provides an active front edge and so prevents stray crop material from accumulating on the front edge. Alternatively a small diameter paddle type or tined rotor (not shown) may be used in place of the plain roller 108, to move the crop into the path of the feed means more positively.

Closely behind the lower brush 103 is situated a full-width or sectioned ground roller 109 to minimize the risk of ground contact and hence soil intake by the lower brush 103. Alternative means (not shown) of ensuring good contour-following are guide wheels or skids fitted at the sides as closely in line as possible with the centre shaft of brush 103, or full-width or sectioned shoe-shaped skids protruding forwardly from support means behind the brush 103, towards its bottom-dead-centre region.

Referring lastly to FIG. 17, this shows a crop-column slicing arrangement for a forage wagon in which crop is picked up at the front by a tine-bar-type pick-up mechanism 180. From the pick-up mechanism, the crop is fed by a feathered set of feed forks 182 (driven by eccentric 184) over a battery of spring-loaded crop-retaining wedges 186 and up an inclined plate 188 providing the bottom wall of an upwardly tapering crop-conveying duct 189. The free ends of forks 182 are pivotally connected to one end of support arms 190 which at their other ends pivot about a fixed support shaft 191.

The top and bottom walls of the duct 189 are slotted to allow an array of crop-cutting knives 193 to extend across the duct as shown.

The principal supports for knives 193 are provided by a series of cross links 194 pivotally secured between the knives 193 and arms 190. At their downstream ends, the knives are driven by an eccentric 195 located outside duct 189 and they co-operate in a scissor-like action with second cutting edges 196 provided by the bottom plate of the duct between the slots in that plate, e.g. by the upward pressings for these slots.

From the slicing mechanism, the chopped crop is forced into the load space of the wagon where it builds up into a heat which can be moved towards the rear of the wagon by engaging a bed chain 197 as is normally done for conventional loader wagons. This bed chain can also be used to empty the trailer body. Alternatively, crop pressure alone can be used to fill the load space.

As already indicated elsewhere in the specification, the input means used in the embodiment of FIG. 16 can equally well be employed in any of the other embodiments illustrated and described in this specification. The dimensions and geometry of the crop feed and knife drive linkages in FIG. 17 are not to scale and only serve as an example of how the feed and comminution may be achieved in an improved loader wagon. Other forms of knife arrays spanning the feed duct and means of activating them, may be used to put the invention into effect.

It will be appreciated that in the embodiments of FIGS. 15 and 16, the compacting ram of the baler will provide the comminuting means with a preformed precompacted column of cut crop on which to operate. In the embodiment of FIG. 16, the magnitude of the peripheral speed of brush 106 is preferably 20% to 40% different to that of brush 103. In an alternative version, brush 106 is replaced by a stationary brush providing a crop-retarding concave for co-operation with rotating brush 103.

We claim:

1. An apparatus for comminuting cut crop comprising an advancement duct, comminuting means providing a plurality of cutting edges extending along and at least in combination spanning, a cross-sectional dimension of the duct, and advancement means for moving a compressed column of the cut crop along the duct towards the comminuting means, each cutting edge being arranged to cut the column along a cutting plane containing that edge and lying substantially parallel to the direction of crop advancement through the duct, and drive means for vibrating the cutting edges in directions lying substantially parallel to said cross-sectional dimension of the duct with said drive means vibrating alternate ones of said cutting edges in anti-phase relative to the remaining ones of said cutting edges.

2. An apparatus as claimed in claim 1 in which the cutting edges are linear cutting edges in the form of knives held in tension across the crop stream.

3. An apparatus as claimed in claim 1 in which the comminuting means is resiliently yieldable to crop pressure for bodily movement in the general direction of crop advancement.

4. An apparatus as claimed in claim 3 in which the advancement means is a reciprocating device adapted for periodic movement of the crop column along the duct and the comminuting means is spring mounted for movement under crop pressure against the returning influence of at least one spring so as to be able to work effectively throughout the compacting and recharging cycle of the advancement means.

5. An apparatus as claimed in claim 1 in which the cutting edges are mounted for movement in a pivotal motion contained within the said cutting plane and the drive means is operative to reciprocate the cutting edges in said pivotal motion.

6. An apparatus as claimed in claim 1 in which the cutting edges are preceded in the crop path by a flow-divider and the comminuting means is provided with support means at a region of the comminuting means shielded from the oncoming crop by the flow-divider.

7. An apparatus as claimed in claim 6 in which a leading edge of the flow-divider presents an additional cutting edge to the crop flow.

8. An apparatus as claimed in claim 1 including input means for supplying cut crop, having herbage stems and leaves, to the inlet end of the duct with the majority of the herbage stems and leaves lying substantially perpendicular to the cutting plane.

9. A forage harvester apparatus for comminuting cut crop comprising an advancement duct, comminuting means providing a plurality of cutting edges extending along and at least in combination spanning, a cross-sectional dimension of the duct, and advancement means for moving a compressed column of the cut crop along the duct towards the comminuting means, each cutting edge being arranged to cut the column along a cutting plane containing that edge and lying substantially parallel to the direction of crop advancement through the duct, and drive means for vibrating the cutting edges in directions lying substantially parallel to said cross-sectional dimension of the duct with said drive means vibrating alternate ones of said cutting edges in anti-phase relative to the remaining ones of said cutting edges.

* * * * *